Patented May 23, 1950

2,508,488

UNITED STATES PATENT OFFICE 2,508,488

SEALING METHOD FOR WIPED JOINTS

George M. Bouton, Madison, and George S. Phipps, Chatham, N. J., assignors to Bell Telephone Laboratories, Incorporated, New York, N. Y., a corporation of New York No Drawing. Application January 7, 1947, Serial No. 720,672

8 Claims. (Cl. 113—112)

This invention relates to a method of sealing joints between hollow members.

An object of the invention is to provide a method for insuring that wiped, brazed or welded joints between hollow or tubular members, and particularly wiped cable sheath joints, are free from porosity. The present invention provides a method which is particularly effective for sealing wiped joints formed between branch joints of large cables.

One of the main problems in using wiping solders for joining lead or other cable sheaths is that porosity tends to develop during the solidification of the solder. This porosity is believed to occur because while the wiping solder is cooling from the liquid state, the highest melting constituent solidifies out first and remains fixed in its position in the joint, while the remaining liquid continues to contract and to drain by gravity, leaving porous sections in the joint. This formation of porosity in wiped joints is especially evident in joints formed between large branched cables, for here the mass of the heated joint is so great that cooling is retarded, providing an opportunity for the molten solder to drain and form porous sections.

The formation of pores or openings in the cable sheath joint is, of course, detrimental to the operation and life of the cable, since in pressure filled cables, the gas under pressure within the cable will leak out, and since moisture from the surrounding atmosphere tends to creep in and impair the insulation on the conductors.

According to the method of the present invention, a wiped cable joint is rendered gas-tight by applying to the surface of the wiping solder, after it has solidified but not cooled completely, a portion of a low melting alloy, which is melted by the residual heat of the wiping solder so that it runs over the surface of the soldered joint, filling up all possible porous spaces and cracks. On solidifying, the low melting alloy seals the pores of the wiped joint forming a hermetic seal and rendering it vacuum tight.

Prior to this invention, in forming branch joints between large cables, a relatively high percentage of the joints formed after the initial wiping procedure showed an undesirable degree of porosity, requiring a laborious rewiping procedure. Even when a second wipe was applied, freedom from porosity was not always obtained, so that a further rewiping process was often required. By the method of the present invention a non-porous joint may be obtained after the first wiping.

The present method is simple and requires no complicated technique on the part of the operator. It has been found to be eminently successful under all conditions under which it is necessary to apply a wipe to cable joints in field operation.

The present method opens up an entirely new field for economies and superior results in the wiping of joints because, while previously the lack of susceptibility to porosity was the main criterion for choosing a wiping solder, now this factor becomes less important and wiping solders may be chosen which are cheaper or in which other valuable properties have not been sacrificed for the sake of superior resistance to porosity. The present method is capable of consistently sealing wiped joints even when formed of solders which are poor from the standpoint of porosity development.

The alloys which may be used for the sealing compound include compositions made up of various metals. The alloy should have a melting point somewhat below the melting point of the solder used to wipe the joint. The alloy should also be one capable of being highly fluid at the temperatures of its melting point and above, so that it will penetrate by capillary action the fine channels present in the wiping solder which are the source of leakage in joints. The alloy should also be capable of alloying with the wiping solder so that when it is applied to the surface of the wiping compound a strong bond will result.

Such alloys may include an alloy of bismuth, lead, and tin in the proportions of from 35 per cent to 60 per cent bismuth, 22 per cent to 37 per cent lead, and 10.0 per cent to 18.5 per cent tin or up to 35 per cent tin, having a melting range from 95° C. to about 130° C. or higher. Also the eutectic mixture may be used comprising 52.5 per cent bismuth, 32 per cent lead, and 15.5 per cent tin with a variation of about plus or minus 1 per cent for each ingredient and melting at about 95° C. This eutectic mixture has the advantage of a low and sharp melting point. The alloy may also be used comprising 37 per cent bismuth, 38 per cent lead, and 25 per cent tin, with a variation of about 1 per cent for each ingredient and melting at from 95° C. to about 125° C. Since it contains less bismuth, this alloy is less costly than the eutectic mixture.

Another alloy which can be used may comprise the eutectic 51 per cent bismuth, 41 per cent lead, and 8 per cent cadmium, with a variation of about plus or minus 1 per cent for each ingredient and melting at 91.5° C. The proportions of this alloy may be varied to include compositions ranging from 39 per cent to 63 per cent bismuth, 31 per cent to 51 per cent lead, and 6 per cent to 10 per cent cadmium. Compositions of these proportions melt at from about 91.5° C. to about 115° C.

Another suitable alloy may comprise 50 per cent bismuth, 27 per cent lead, 13 per cent tin, and 10 per cent cadmium with variations of from plus or minus 2 per cent to plus or minus 5 per cent in the amount of each element. The melting point of this alloy ranges from 70° C. to about 75° C.

Still another alloy suitable for use as a sealing compound may comprise the eutectic 55 per cent bismuth and 45 per cent lead, which melts at 125° C. The proportions of each of the ingredients may be varied by about plus or minus 2 per cent. If a non-eutectic mixture of these elements is used, the alloy may melt from 125° C. to about 135° C.

The wiping solder used for wiping the joints prior to the application of the above-described sealing alloys may comprise most of the solders commonly used for this purpose. Some of these solder compositions are listed below:

a. 32 per cent tin, 2 per cent antimony, 0.1 per cent arsenic, and the remainder lead (melting from about 183° C. to about 247° C.)
b. 38 per cent tin, 0.3 per cent antimony, and the remainder lead (melting from about 183° C. to about 240° C.)
c. 23 per cent tin, 9 per cent cadmium, and the remainder lead (melting from about 145° C. to about 235° C.)

Other wiping solders than those mentioned above may, of course, be used. The above-mentioned wiping solders and other wiping solders may be used with any of the sealing alloys heretofore described, or with other sealing alloys not described herein, provided that two factors are observed:

1. The sealing alloy and the wiping solder should be capable of alloying with each other, so that a strong bond between the two of them can be formed.
2. The melting point of the wiping solder should be sufficiently above the melting point of the sealing alloy, so that ample time is available between the point of complete solidification of the wiping solder and the melting point of the sealing alloy, to permit time for effective application of the sealing alloy.

In practicing the method of the present invention, the joint is wiped with the wiping solder in the usual manner. The solder is allowed to solidify completely, but before it has had time to cool down more than a few degrees below the melting point, a strip of the sealing alloy is held against the surface of the wiping solder. Since the melting point of the sealing alloy is below that of the wiping solder, the residual heat contained in the wiping solder is sufficient to melt the sealing alloy, so that it will liquefy and flow over the surface of the wiping solder, filling up the various porous spaces and cracks which may be present in the sealing solder. If desired, a small wiping cloth may be used to wipe the melted alloy around the joint until it covers all parts. It is not necessary to apply heat from an outside source to melt the sealing alloy since the residual heat contained in the wiping solder in sufficient.

This method of forming gas-tight joints between tubular members may also be applied to members which have been joined together by brazing or welding. For example, the low melting alloy may be applied to the welded or brazed joint after it has solidified but while it is still hot, so that the residual heat of the joint will melt the alloy causing it to run over the surface of the joint and fill up the pores and cracks which may be present.

The low melting sealing solders may also be used to eliminate porosity in wiped, brazed or welded joints already in service. In this application the joints must be thoroughly cleansed and heated to a temperature below the melting point of the metal forming the joint, after which the sealing solder is applied in the manner previously described. The joint may be heated by means of a torch or by pouring a hot reducing liquid such as paraffin on the joint.

The following examples may be taken as illustrations of the present invention.

*Example 1.*—A branched joint in a lead sheathed cable, of which the outer diameter of the covering sleeve was about six inches and the outer diameters of the two smaller branches were each about two and one-half inches in diameter, was wiped with an alloy comprising 32 per cent tin, 2 per cent antimony, 0.1 per cent arsenic, and the remainder lead, having a melting range of from 183° C. to about 247° C. The wiping alloy was allowed to solidify completely. Shortly after the alloy had solidified completely, that is when the temperature was about 180° C., about one and one-half ounces of a solid piece of a sealing alloy was held in contact with the hot wiped joint. The sealing alloy comprised 52.5 per cent bismuth, 32 per cent lead, and 15.5 per cent tin, and melted at 95° C. Since the melting point of the sealing compound was considerably lower than the temperature of the solidified wiping solder, the sealing compound melted relatively easily and ran over the surface of the wiped joint. A small wiping cloth was used to wipe the molten alloy around the joint. When the sealing compound solidified, a compact hermetically sealed joint was produced.

*Example 2.*—A joint in a lead-sheathed cable was wiped with an alloy comprising 23 per cent tin, 9 per cent cadmium, and the remainder lead, melting at from 145° C. to 235° C. After the wiping solder had solidified completely, but while it was still hot, a portion of an alloy comprising 50 per cent bismuth, 27 per cent lead, 13 per cent tin, and 10 per cent cadmium melting at from 70° C. to 75° C. was held in contact with the hot wiped joint. The sealing alloy melted and drained around the joint. After the sealing compound had solidified the joint was found to be vacuum-tight.

*Example 3.*—A joint in a lead-sheathed cable was wiped with a wiping solder comprising 38 per cent tin, 0.3 per cent antimony, and the remainder lead, melting at from 183° C. to 240° C. When the wiping solder had solidified completely, but while it was still hot, a solid piece of alloy comprising 55 per cent bismuth and 45 per cent lead and melting at 125° C. was held in contact with the hot wiped joint. When the alloy melted it was wiped around the joint so as to fill all possible pores and openings present in the solidified wiping solder. When the sealing solder had solidified, a hermetically sealed joint resulted.

The sealing method of the present invention can, of course, be used to form hermetic seals on cable sheaths made of other metals than lead, and also on devices wherein a joint between two hollow articles is formed, such as various forms of piping, particularly lead piping.

It is also to be understood that various changes may be made in the steps of the method, and that known chemical equivalents may be employed and that changes may be resorted to in the proportions of the ingredients, without departing from the spirit of the invention.

What is claimed is:

1. The method of forming uniformly gas-tight wiped joints in tubular members comprising wiping the joint with a non-eutectic wiping solder, allowing the solder to solidify but not cool substantially more than necessary for solidification, contacting a solid piece of an alloy which has a melting point below that of the wiping solder and which is capable of forming an alloy with said wiping solder with the wiped joint before the surface of wiped joint has cooled below the melting point of said low melting alloy, maintaining said contact until said alloy has melted and wiping the outer surface of the wiped joint with said molten alloy, said molten alloy forming an alloy with the surfaces of said wiping solder with which it comes into contact.

2. A method of forming a gas-tight joint between tubular members comprising wiping the joint with a non-eutectic wiping solder, cooling said solder to the point of solidification, contacting a portion of an alloy which has a melting point lower than the melting point of said wiping solder and which is capable of alloying with said wiping solder, with the wiped joint before the surface of the wiped joint has cooled below the melting point of said low melting alloy, maintaining said low melting alloy in contact with the wiped joint until said alloy is melted by the residual heat remaining in the wiped solder, whereby said alloy liquefies and flows over the surface of said wiped solder to fill up the porous spaces in said wiped solder and form an alloy with the surface of the wiped solder with which it comes into contact.

3. The method of claim 2 in which the wiping solder comprises about 32 per cent tin, about 2 per cent antimony, about 0.1 per cent arsenic, and the remainder essentially lead, and the low melting alloy comprises bismuth, lead and tin.

4. The method of claim 2 in which the low melting alloy comprises 39 per cent to 63 per cent bismuth, 31 per cent to 51 per cent lead, and 6 per cent to 10 per cent cadmium, substantially no other ingredients being present except incidental impurities.

5. The method of claim 2 in which said low melting alloy comprises about 32 per cent lead, 52.5 per cent bismuth, and 15.5 per cent tin, with a variation in each ingredient of about plus or minus 1 per cent, and substantially no other ingredients present except impurities.

6. The method of forming uniformly sound wiped joints in tubular members comprising wiping the joint with a non-eutectic wiping solder, cooling the solder to its freezing point but not substantially below, contacting a solid piece of an alloy having a melting point below that of the wiping solder and being capable of alloying with said solder with the wiped joint before the surface of the wiped joint has cooled below the melting point of said low melting alloy, and causing said alloy to melt and run into any porous spaces which may be present in the wiped solder, said low melting alloy comprising from 35 per cent to 60 per cent bismuth, 22 per cent to 37 per cent lead, and 10 per cent to 35 per cent tin, substantially no other ingredients being present, except impurities, said low melting alloy forming an alloy with said wiped solder.

7. The method of forming a sealed joint between tubular members employing a non-eutectic wiping solder containing lead as its principal ingredient, and an alloy having a melting point considerably lower than the melting point of said solder and being capable of alloying with said solder, said method comprising wiping said joint with said wiping solder, cooling the wiped solder to the point of solidification, contacting a portion of said alloy with said wiped solder while the surface of said wiped solder is at a temperature substantially above the melting point of said alloy, maintaining said alloy portion in contact with said wiper solder until said alloy portion is melted by the residual heat remaining in the wiper solder, and wiping the liquefied alloy into the pores in the wiped solder joint to form an alloy with the surfaces of the wiped solder with which it comes into contact.

8. The method of forming gas-tight joints in tubular members comprising using molten metal to form a joint between said tubular members, cooling said joint to the freezing point of said molten metal, applying to the surface of said joint a solid piece of an alloy which has a melting point lower than the melting point of said joint-forming metal and which is capable of alloying with said joint-forming metal, the temperature of the metal of the joint at the time of application of said alloy lying between the freezing point of said metal forming the joint and the melting point of said alloy, and melting said alloy by means of the residual heat contained in the metal of said joint and directing the molten alloy by capillary action into the fine channels present in the metal of the joint, whereby said alloy forms an alloy with the surface of the metal of the joint with which it comes into contact.

GEORGE M. BOUTON.
GEORGE S. PHIPPS.

REFERENCES CITED

The following references are of record in the file of this patent:

UNITED STATES PATENTS

| Number | Name | Date |
| --- | --- | --- |
| 369,121 | Patterson | Aug. 30, 1887 |
| 803,920 | Moffett | Nov. 7, 1905 |
| 993,195 | Phelps | May 23, 1911 |
| 1,920,791 | Hogan | Aug. 1, 1933 |
| 2,236,862 | Williams | Apr. 1, 1941 |
| 2,247,559 | Phipps | July 1, 1941 |
| 2,287,227 | Bowsher | June 23, 1942 |
| 2,348,358 | Phillips | May 9, 1944 |
| 2,370,439 | Beard | Feb. 27, 1945 |

OTHER REFERENCES

"Steel," Mag. Tin-Free and Low—Tin Solders, Feb. 26, 1945, pp. 86, 87, 88, 90, 92, 132, 134 and 136.